United States Patent Office 2,888,432
Patented May 26, 1959

2,888,432

PROCESS OF CURING A POLYURETHANE WITH A MIXTURE OF DIISOCYANATE AND POLYESTER

Ernest E. Fauser, Cuyahoga Falls, Ohio, assignor to The Goodyear Tire & Rubber Company, Akron, Ohio, a corporation of Ohio No Drawing. Application March 23, 1955
Serial No. 496,317

1 Claim. (Cl. 260—45.4)

This invention relates to the compounding of unvulcanized synthetic polymers formed from the reaction of polymeric materials containing active-hydrogen atoms and diisocyanates. More particularly, it relates to a new composition of matter useful as a curative for synthetic unvulcanized polymer formed from diisocyanates and polyesters, polyesteramides and polyalkylene ether glycols and to methods for preparing these new compositions of matter. The invention also relates to methods of improving the physical properties of the synthetic polymers by the use of the new compositions of matter.

The preparation of unvulcanized synthetic polymers from polyesters or polyesteramides and diisocyanates has been described in United States Patents 2,625,531; 2,625,532; and 2,625,535. As described therein these unvulcanized synthetic polymers are prepared from polyesters or polyesteramides of specified molecular weight and chemical composition with controlled amounts of designated diisocyanates. Similar synthetic polymers may be prepared by reacting diisocyanates with polyalkylene ether glycols as described in United States Patents 2,692,873 and 2,702,797. The unvulcanized synthetic polymers are similar in physical properties to unvulcanized natural rubber and, as such, are mixed, subsequent to their preparation, with compounding ingredients and a curative which is usually a polyisocyanate or mixtures of polyisocyanates. Some of the curative polyisocyanates are liquid, while others are powders, and still others are resinous in character. The liquid and resinous polyisocyanates present no particular problem when added to and mixed with the unvulcanized synthetic polymer. However, the curative polyisocyanates which are powders or pigments do not disperse into the synthetic polymer with the desired degree of ease and uniformity and these powder-like materials also tend to form dust which is blown into the air surrounding the milling installation with the result that the exact amount of curative which is actually incorporated into the polymer is indefinite and some of the expensive curative polyisocyanate is lost.

It is, therefore, an object of this invention to prepare curatives from the pigment or powder-like polyisocyanates which disperse readily and uniformly into the unvulcanized synthetic polymer during the mixing operation. It is a further object to produce curatives from the powdery polyisocyanates which have less tendency to dust during the mixing operation. It is another object of this invention to provide a composition of matter which functions as a plasticizer, as well as a curative, for the unvulcanized synthetic polymer. Another object is to provide a curative for the unvulcanized synthetic polymer which reduces the tendency of the unvulcanized polymer to cure prematurely after the curative has been added. Still another object is to provide a curative for the unvulcanized synthetic polymers which improves the tackiness of the unvulcanized polymer. Other objects will appear as the description proceeds.

According to the practice of this invention the new curatives are prepared by mixing a diisocyanate selected from the group consisting of 4,4'-diphenyl diisocyanate; 1,5-naphthalene diisocyanate; 3,3'-dimethyl 4,4'-diphenyl diisocyanate; 3,3'-dimethoxy 4,4'-diphenyl diisocyanate; methylene 3,3' dimethyl diphenyl 4,4'-diisocyanate and N,N'-(3,3' diisocyanate 4,4'-dimethyl-diphenyl) urea with an active-hydrogen-containing material having an average molecular weight of from 1500 to 2500 and selected from the group consisting of polyesters, polyesteramides and polyalkylene ether glycols, the diisocyanate being employed in a range from 40 to 85% by weight and the active-hydrogen-containing material being employed in a range from 60 to 15% by weight. By the term "active-hydrogen" is means those hydrogen atoms which are reactive as detected and determined by the Zerewitinoff method. It is preferred to use an active-hydrogen-containing polymeric material having a molecular weight of approximately 2000 and to employ this material in a range of from 50 to 35% by weight of the mixture. Best results are obtained using approximately 40% of the active-hydrogen-containing polymeric material by weight of the mixture.

The specific diisocyanates listed above are those which are particularly useful as curatives for the unvulcanized synthetic polymer and which, because of their powdery nature, have proven to be objectionable when mixed with the unvulcanized polymer. The polyesters and polyesteramides are prepared from dibasic carboxylic acids, such as adipic acid, and glycols, such as ethylene and propylene glycol, with the optional use of small amounts of amide-forming compounds such as diamines, amino alcohols and amino carboxylic acids. The polyalkylene ether glycols are hydroxyl-terminated polyethers derived from alkylene oxides or glycols or from other heterocyclic ethers such as dioxolane. These glycols are either viscous liquids or waxy solids capable of being melted at relatively low temperatures. Further examples of the polyalkylene ether glycols and methods for their preparation are described in U.S. Patents 2,692,873 and 2,702,797.

The practice of this invention is illustrated by the following experimental examples, in which, unless otherwise specified, parts are shown by weight:

EXAMPLE 1

A polyester (30 parts) prepared from adipic acid and 80 mol percent of ethylene glycol and 20 mol percent of propylene glycol and having an average molecular weight of 1990 was heated to 110° C. and mixed with 45 parts of 4,4'-diphenyl diisocyanate. The mixture was thoroughly stirred after which it was permitted to cool. Upon cooling, the mixture became a viscous, pasty mass in which the diisocyanate was thoroughly dispersed in the polyester.

EXAMPLE 2

A polyester (30 parts) prepared from adipic acid and 80 mol percent of ethylene glycol and 20 mol percent of propylene glycol and having an average molecular weight of 1990 was heated to 120° C. and mixed with 45 parts of 1,5-naphthalene diisocyanate. The mixture was thoroughly stirred after which it was permitted to cool. Upon cooling, the mixture became a viscous, pasty mass in which the diisocyanate was thoroughly dispersed in the polyester.

EXAMPLE 3

An uncured synthetic polymer was prepared by reacting a polyester formed from adipic acid and approximately 80 mol percent of ethylene glycol and 20 mol percent of propylene glycol and having an average molecular weight of 1870 with slightly less than an equal molecular amount of 4,4'-diphenyl diisocyanate. This unvulcanized polymer (400 parts) was mixed with 40.5 parts of the polyester/diisocyanate mixture prepared according to Example 1 and with 20 parts of white factice which is a compounding ingredient employed to improve the physical properties of the cured material. The mixing was accomplished on a conventional open rubber mill. It was observed that the polyester/diisocyanate curative dispersed very readily into the unvulcanized polymer and that there were no signs of dusting of the curative while the milling operation was taking place.

EXAMPLE 4

An uncured synthetic polymer was prepared by reacting a polyester formed from adipic acid and approximately 80 mol percent of ethylene glycol and 20 mol percent of propylene glycol and having an average molecular weight of 1870 with slightly less than an equal molecular amount of 4,4'-diphenyl diisocyanate. This unvulcanized polymer (400 parts) was mixed with 21.2 parts of 4,4'-diphenyl diisocyanate. The mixing was accomplished on a conventional open rubber mill. It was observed that the curative diisocyanate did not readily disperse into the unvulcanized polymer and formed dust while the milling operation was taking place.

EXAMPLE 5

An uncured synthetic polymer was prepared by reacting a polyester formed from adipic acid and approximately 80 mol percent of ethylene glycol and 20 mol percent of propylene glycol and having an average molecular weight of 1870 with slightly less than an equal molecular amount of 1,5-naphthalene diisocyanate. This unvulcanized polymer (500 parts) was mixed with 52.2 parts of the polyester/diisocyanate mixture prepared according to Example 2 and with 20 parts of white factice. The mixing was accomplished on a conventional open rubber mill. It was observed that the polyester/diisocyanate curative dispersed very readily into the unvulcanized polymer and that there were no signs of dusting of the curative while the milling operation was taking place.

EXAMPLE 6

An uncured synthetic polymer was prepared by reacting a polyester formed from adipic acid and approximately 80 mol percent of ethylene glycol and 20 mol percent of propylene glycol and having an average molecular weight of 1870 with slightly less than an equal molecular amount of 1,5-naphthalene diisocyanate. This unvulcanized polymer (500 parts) was mixed with 28 parts of 1,5-naphthalene diisocyanate and with 20 parts of white factice. The mixing was accomplished on a conventional open rubber mill. It was observed that the curative diisocyanate did not disperse readily into the unvulcanized polymer and formed dust while the milling operation was taking place. It was also observed that the fully compounded polymers prepared using the polyester/diisocyanate curative were plasticized during the milling operation to a greater extent than were the polymers prepared using the powdered diisocyanate. To demonstrate this, plastic flow data were determined on each of the four examples as shown in Table I below. The figures reported in the table represent the number of seconds required to extrude one inch of the polymer through an orifice of approximately 1/8 inch in diameter under a pressure of 500 pounds per square inch and at a temperature of 212° F.

Table I

| Examples: | Plastic flow values |
| --- | --- |
| 3 | 162 |
| 4 | 194 |
| 5 | 245 |
| 6 | 258 |

It is evident from the results of the plastic flow data shown in Table I that the polymers employing the polyester/diisocyanate curative were plasticized by the curative since the plastic flow values for Examples 3 and 5 were lower than the values for Examples 4 and 6 respectively.

In addition to the apparent plasticizing of the unvulcanized rubber by the use of the polyester/diisocyanate mixture it was also observed that the unvulcanized rubbers using the polyester/diisocyanate mixture showed improved tackiness over the examples prepared using the powdered diisocyanate. This increase in tackiness of the unvulcanized rubber is particularly important during fabricating operations where successive layers of rubber remain adhered to one another by means of the inherent tackiness of the surface of the two layers.

Test sheets were cured from each of Examples 3, 4, 5 and 6 for 30 minutes at 300° F. Table 2 lists the physical properties of the cured sheets:

Table II

| Example | 3 | 4 | 5 | 6 |
| --- | --- | --- | --- | --- |
| Tensile (pounds per square inch) | 5,450 | 5,500 | 5,300 | 5,250 |
| Elongation (Percent) | 700 | 690 | 670 | 710 |

It will be observed by analyzing the results in Table II that the cured physical properties of the examples employing the polyester/diisocyanate curative are substantially equivalent to the physical properties obtained using the powdered diisocyanate. Thus, without adversely affecting the quality of the finished product, it is possible, by employing the mixture of the active-hydrogen-containing material and curative diisocyanate, to eliminate dusting, to improve dispersion, to increase tackiness, to plasticize and to reduce the possibility of scorching the fully compounded polymer.

While certain representative embodiments and details have been shown for the purpose of illustrating the invention, it will be apparent to those skilled in this art that various changes and modifications may be made therein without departing from the spirit or scope of the invention.

I claim:

In the process of curing an unvulcanized non-cellular elastomeric organic diisocyanate-modified polyester, said polyester being prepared from at least one dicarboxylic acid and at least one glycol, by adding curative diisocyanate to said modified polyester and heating the mixture to effect a cure thereof, the curative diisocyanate being selected from the group consisting of 4,4'-diphenyl diisocyanate; 1,5-naphthalene diisocyanate; 3,3'-dimethyl 4,4'-diphenyl diisocyanate; 3,3'-dimethoxy 4,4'-diphenyl diisocyanate; methylene 3,3'-dimethyl diphenyl 4,4'-diisocyanate and N,N'-(3,3'-diisocyanate 4,4'-dimethyl diphenyl) urea, the improvement which comprises adding said curative diisocyanate to said diisocyanate-modified polyester in the form of a mixture containing from 40% to 85% by weight of the curative diisocyanate and from 60% to 15% by weight of a polyester prepared from at least one dicarboxylic acid and at least one glycol and having a molecular weight ranging from 1500 to 2500.

References Cited in the file of this patent

UNITED STATES PATENTS

| 2,692,873 | Langerak et al. | Oct. 26, 1954 |
| 2,692,874 | Langerak et al. | Oct. 26, 1954 |
| 2,729,618 | Muller et al. | Jan. 3, 1956 |
| 2,753,319 | Brockway | July 3, 1956 |
| 2,814,605 | Stilmar | Nov. 26, 1957 |
| 2,814,606 | Stilmar | Nov. 26, 1957 |

FOREIGN PATENTS

| 700,611 | Great Britain | Dec. 9, 1953 |
| 1,050,550 | France | Jan. 8, 1954 |
| 1,052,107 | France | Jan. 21, 1954 |
| 150,416 | Australia | May 3, 1951 |